(12) United States Patent
Ishibai et al.

(10) Patent No.: US 7,820,584 B2
(45) Date of Patent: Oct. 26, 2010

(54) VISIBLE LIGHT-RESPONSIVE PHOTOCATALYST, METHOD FOR PRODUCING SAME, PHOTOCATALYST COATING AGENT USING SAME, AND PHOTOCATALYST DISPERSION

(75) Inventors: Youichi Ishibai, Yokkaichi (JP); Takashi Nishikawa, Yokkaichi (JP); Junya Sato, Yokkaichi (JP)

(73) Assignee: Nihon Nohyaku Co., Ltd., Tokyo (JP)

( * ) Notice: Subject to any disclaimer, the term of this patent is extended or adjusted under 35 U.S.C. 154(b) by 0 days.

(21) Appl. No.: 12/225,011

(22) PCT Filed: Mar. 13, 2007

(86) PCT No.: PCT/JP2007/054886

§ 371 (c)(1),
(2), (4) Date: Sep. 11, 2008

(87) PCT Pub. No.: WO2007/105705

PCT Pub. Date: Sep. 20, 2007

(65) Prior Publication Data

US 2009/0048098 A1  Feb. 19, 2009

(30) Foreign Application Priority Data

Mar. 14, 2006 (JP) ............................ 2006-069917

(51) Int. Cl.
*B01J 27/135* (2006.01)
(52) U.S. Cl. ...................................... 502/227; 502/230
(58) Field of Classification Search ............... None
See application file for complete search history.

(56) References Cited

U.S. PATENT DOCUMENTS 6,653,356 B2 * 11/2003 Sherman ...................... 516/90

FOREIGN PATENT DOCUMENTS

| JP | 9-208438   | 8/1997  |
| JP | 11-079712  | 3/1999  |
| JP | 2002-29750 | 1/2002  |
| JP | 2002-239395 | 8/2002 |
| JP | 2003-320250 | 11/2003 |
| JP | 2004-073910 | 3/2004 |

* cited by examiner

*Primary Examiner*—Melvin C Mayes
*Assistant Examiner*—Melissa Stalder
(74) *Attorney, Agent, or Firm*—Paul E. White, Jr.; Manelli Denison & Selter PLLC

(57) ABSTRACT

Disclosed is a photocatalyst which is excited when irradiated with visible light and exhibits high photocatalytic activity stably. This photocatalyst has a white hue with little yellow tint. Specifically, titanium oxide particles and a halogenated platinum compound are heated and mixed in a liquid medium, so that the surfaces of the titanium oxide particles are loaded with the halogenated platinum compound; then the pH of the liquid medium is adjusted to 5 or less; and after that, the liquid medium is neutralized if necessary. By such a process, there can be produced a photocatalyst having a specific surface area of 10-100 $m^2/g$, wherein the surfaces of the titanium oxide particles are loaded with the halogenated platinum compound and the b* value of the powder color according to the Hunter color system is not more than 6.

8 Claims, No Drawings

VISIBLE LIGHT-RESPONSIVE PHOTOCATALYST, METHOD FOR PRODUCING SAME, PHOTOCATALYST COATING AGENT USING SAME, AND PHOTOCATALYST DISPERSION

This application is the national phase of international application PCT/JP2007/054886 filed 13 Mar. 2007 which designated the U.S.

TECHNICAL FIELD

The present invention relates to a so-called visible light-responsive photocatalyst which can be excited under irradiation with visible light and a method for producing same, a photocatalyst coating agent using same, and a photocatalyst dispersion.

BACKGROUND ART

Photocatalysts are excited when irradiated with light of wavelength having an energy higher than the band gap to exhibit strong catalytic activity. Particularly, they are high in oxidation power and decomposition power for organic materials or a part of inorganic materials such as $NO_x$, and a light which is low in cost and very small in environmental load can be utilized as an energy source. Therefore, application of the photocatalysts to environmental purification, deodorization, anti-pollution, and sterilization has recently been made intensively. Moreover, it has been found that when photocatalysts are excited, the surface thereof becomes hydrophilic, resulting in reduction of contact angle with water, and utilizing this action, application to inhibition of fogging and pollution has also been conducted. As the photocatalysts, there are generally used metallic compounds such as oxides and sulfides, particularly, fine particles of titanium oxide and zinc oxide having high photocatalytic activity. However, since wavelength of excitation light for titanium oxide or zinc oxide is in the ultraviolet region of 400 nm or less, special light sources such as ultraviolet lamp are necessary, and field of utilization is limited. Therefore, a technology of exhibiting photocatalytic activity under irradiation with visible light by doping titanium oxide with different elements such as nitrogen, sulfur and carbon has been proposed, and there is known, for example, a method of obtaining a nitrogen-doping type visible light-responsive photocatalyst titanium oxide by reacting an amorphous titanium oxysulfate with a nitrogen-containing compound such as an urea compound or an amine compound, and then firing the reaction product (Patent Document 1). There are also known technologies to give photocatalytic activity under irradiation with visible light by supporting a halogenated platinum compound on the surface of titanium oxide particles (Patent Document 2) or supporting a halogenated platinum compound on titanium oxide particles having anisotropic shapes such as spindle-like, rod-like and acicular shapes (Patent Document 3).

Patent Document 1: JP-A-2002-29750
Patent Document 2: JP-A-2002-239395
Patent Document 3: JP-A-2004-73910

DISCLOSURE OF INVENTION

Problem to be solved by the Invention

The nitrogen-doping type photocatalyst disclosed in Patent Document 1 has problems that it is insufficient in photocatalytic activity under irradiation with visible light, and has strong yellowish color tone, and particles thereof are not satisfactory in hue, and, for example, when the photocatalyst is incorporated in a photocatalyst coating agent, the coating agent is colored in yellowish tone, resulting in limitation in use. According to the technologies of Patent Documents 2-3, excellent photocatalytic activity under irradiation with visible light can be obtained, and the resulting photocatalyst is less in yellowish color tone as compared with the nitrogen-doping type photocatalysts. However, since the halogenated platinum compound per se has light yellow color, the photocatalyst having the halogenated platinum compound supported thereon also has light yellow color, and hence photocatalysts further reduced in yellowish color tone have been demanded. Thus, the present invention provides a visible light-responsive photocatalyst which is excellent in photocatalytic activity under irradiation with visible light and has white hue less in yellowness.

Means for Solving the Problem

As a result of the intensive research conducted by the inventors, it has been found that in the technology of contacting titanium oxide particles with a halogenated platinum compound in a liquid medium to support the halogenated platinum compound on the surface of the titanium oxide particles, when titanium oxide particles having a specific surface area in a specific range are used and pH of the liquid medium after contacting is adjusted to acidic area, coloration of the supported halogenated platinum compound can be inhibited, and hue can be improved while maintaining the excellent photocatalytic activity under irradiation with visible light obtained by supporting the halogenated platinum compound. Thus, the present invention has been accomplished.

That is, the present invention includes the following embodiments.

(1) A visible light-responsive photocatalyst comprising a titanium oxide particle and a halogenated platinum compound supported on the surface of the titanium oxide particle, wherein a specific surface area of the photocatalyst is 10-100 $m^2/g$ according to the BET method, and a b* value of the powder color of the photocatalyst is not more than 6 according to the Hunter color system.

(2) A method for producing a visible light-responsive photocatalyst which comprises contacting a titanium oxide particle and a halogenated platinum compound in a liquid medium to support the halogenated platinum compound on the surface of the titanium oxide particle, and then adjusting pH of the liquid medium to 5 or less.

(3) A photocatalyst coating agent which contains at least the above visible light-responsive photocatalyst and a binder.

(4) A photocatalyst dispersion which contains at least the above visible light-responsive photocatalyst and a dispersion medium.

Advantages of the Invention

Since the photocatalyst of the present invention has excellent photocatalytic activity under irradiation with visible light having a wavelength of 400-800 nm, it can effectively decompose $NO_x$ or organic environmental pollutants even under interior illumination such as fluorescent lamp or sunlight without using special light sources such as ultraviolet lamps, and the hydrophilic effect can also be expected. Therefore, the photocatalyst is suitable as purifying agents, deodorizing agents, anti-pollution agents, sterilizing agents, anti-fogging agents, etc. Even when the photocatalyst is irradiated with light for a long period of time, the photocatalytic activity hardly decreases, and hence it can be used continuously for a long time. Furthermore, the photocatalyst in the form of powder has white hue less in yellowness and can be applied to a wide variety of uses.

Moreover, the photocatalyst of the present invention can be made to coating agents and dispersions, and using them, functionalities such as anti-pollution properties and hydrophilic properties can be given to a base, and furthermore, the photocatalyst is hardly limited in its use due to its hue, and can be applied to a wide variety of uses and does not damage appearance and designing of base or coat on the surface of the base.

BEST MODE FOR CARRYING OUT THE INVENTION

The present invention relates to a visible light-responsive photocatalyst which comprises titanium oxide particles and a halogenated platinum compound supported on the surface of the titanium oxide particles, has a specific surface area of 10-100 $m^2/g$ according to the BET method, and has a b* value of the powder color of not more than 6 according to the Hunter color system.

The technology of imparting photocatalytic activity under irradiation with visible light by supporting a halogenated platinum compound on titanium oxide particles has been known, but the halogenated platinum compound per se has light yellow color, and hence the photocatalyst having the halogenated platinum compound supported thereon has also light yellow color. Titanium oxide decreased in particle diameter, namely, increased in specific surface area, have properties of strongly scattering a light of short wavelength in visible light range, and therefore mere improvement of hue can be attained by fining the titanium oxide particles used as a base. Moreover, since the finer titanium oxide particles increase in adsorbability, the titanium oxide particles used for photocatalyst are usually very finely designed so that they can adsorb materials to be treated, such as organic materials and nitrogen oxides, and can efficiently decompose them. On the other hand, it is said that photocatalytic activity of titanium oxide particles is developed when electrons or holes generated inside titanium oxide by irradiation with light move through crystals and reach the surface of particles. However, excellent crystallinity can hardly be obtained for fine titanium oxide particles, and hence it is considered that movement of electrons or holes is hindered and the photocatalytic activity inherently possessed by titanium oxide is not sufficiently utilized.

The present invention has been accomplished upon finding that titanium oxide particles having a specific surface area in the range of 10-100 $m^2/g$ according to the BET method are proper in size for satisfying both the adsorbability and crystallinity, and by supporting a halogenated platinum compound on the above titanium oxide particles, excellent photocatalytic activity under irradiation with visible light is obtained and coloration of the halogenated platinum compound is inhibited, and the titanium oxide particles can have a small b* value of the powder color in the above range, namely, white hue less in yellowness without reducing particle diameter.

The halogenated platinum compound in the present invention means a compound containing at least one halogen atom and platinum metal. When the supported halogenated platinum compound contains less halogen atoms, coloration can be inhibited, which is preferred, and more preferred state is such that one halogen atom is bonded to the platinum metal. If the b* value of the powder color is more than 6, yellowness increases, which is not preferred.

As compared with different element-doping type photocatalysts, the photocatalyst of the present invention is high in whiteness, which is preferably at least 96 represented by the L* value of powder color according to the Hunter color system. Therefore, in the case of coloring the photocatalyst coating agent with pigment, dye, dyestuff, or the like, clear color tone with high lightness can be obtained. The more preferred range of specific surface area is 30-80 $m^2/g$, the preferred range of b* value is −1-6, the more preferred range is 3-6, and the preferred range of L* value is 96-100.

Furthermore, the photocatalyst of the present invention is not only high in initial photocatalytic activity under irradiation with visible light, but also hardly decreases in photocatalytic activity even when irradiated with light for a long period of time, and thus it can be continuously used.

The powder color in the present invention is measured by the following method. Furthermore, "visible light-responsive photocatalyst" in the present invention means a photocatalyst in which development of photocatalytic activity can even slightly be recognized by measuring photocatalytic activity when irradiated with visible light having a wavelength of 400-800 nm. For measurement of photocatalytic activity, there may be measured decomposition activity for organic materials such as acetaldehyde, removal activity for $NO_x$ gas or contact angle with water.

(Method of Measurement of Powder Color)

Five grams of a sample is filled in an aluminum ring (inner diameter: 33 mmϕ, thickness: 5 mm) and compression molded under a pressure of 10 t/$cm^2$ for 5 seconds by a pressing machine, and b* value and L* value of the resulting molded product are measured using a spectrophotometer. The smaller the b* value, the lower the yellowish tone, and the larger the L* value, the higher the whiteness.

Titanium oxides contained in the titanium oxide particles include those which are called anhydrous titanium oxide, hydrous titanium oxide, hydrated titanium oxide, titanium hydroxide, titanic acid, or the like, in addition to general oxides of titanium, and crystal forms such as anatase type and rutile type are not particularly limited, and may be amorphous form or mixtures thereof. Furthermore, so long as the excitation is not adversely affected, the titanium oxide particles may contain at least one different element selected from V, Fe, Co, Ni, Cu, Zn, Ru, Rh, Pd, Ag and Au or compounds of the different elements such as oxides.

The shape of titanium oxide particles has no limitation, and there may be used particles of definite shape such as true spherical shape, almost spherical shape and anisotropic shape, and particles of indefinite shape such as particulate mass, and particularly those having anisotropic shape are preferred because excellent photocatalytic activity under irradiation with visible light can readily be obtained. The particles of "anisotropic shape" in the present invention are those generally called spindle-shaped particles, rod-shaped particles, acicular particles, platy particles, etc. The particles of "anisotropic shape" are those which satisfy the formula l>w≧h (when one primary particle is allowed at rest on a plane in the most stable state, and a projected image of the particle on the plane is sandwiched between two parallel lines, and when the distance between the parallel lines becomes minimum, this distance is called width of particle or minor-axis length (w); a distance between two parallel lines which are perpendicular to the said two parallel lines and sandwiches the projected image is called length of the particle or major-axis length (l); and when the particle is sandwiched between a plane parallel to the maximum stable plane, the distance is called height of the particle (h)). The average major-axis length, minor-axis length and height are calculated by obtaining arithmetical mean value of about 1000 particles from electron microphotographs of primary particles. As for the size of the particles having anisotropic shape used in the present invention, there are used those which have a specific surface area of 10-100 m$^2$/g, preferably 30-80 m$^2$/g according to the BET method. As such particles having anisotropic shape, preferred are those which have an average major-axis length of 10-500 nm and an average minor-axis length of 1-25 nm, and among them, preferred are spindle-shaped particles, rod-shaped particles and acicular particles having an aspect ratio (average major-axis length/average minor-axis length) of 1.5 or more, and more preferred are those having an aspect ratio of 1.5-10, further preferred are those having an aspect ratio of 2-7.

The halogenated platinum compound to be supported is preferably an inorganic halogenated platinum compound. The inorganic halogenated platinum compounds include platinum chloride compounds containing at least one chlorine atom and platinum metal, platinum bromide compounds containing at least one bromine atom and platinum metal, platinum iodide compounds containing at least one iodine atom and platinum metal, and platinum fluoride compounds containing at least one fluorine atom and platinum metal. These compounds may contain atoms other than halogen atoms and platinum metal.

The platinum chloride compounds include hydrates thereof, and chloroplatinic acid, chloroplatinic acid salts, chloroplatinic complex salts, and hydrates thereof. Similarly, platinum bromide compounds include hydrates thereof, and bromoplatinic acid, bromoplatinic acid salts, bromoplatinic complex salts, and hydrates thereof, platinum iodide compounds include hydrates thereof, and iodoplatinic acid, iodoplatinic acid salts, iodoplatinic complex salts, and hydrates thereof, and platinum fluoride compounds include hydrates thereof, and fluoroplatinic acid, fluoroplatinic acid salts, fluoroplatinic complex salts, and hydrates thereof.

The platinum chloride compounds further include platinum chlorides which contain at least one chlorine atom and platinum metal, and aquo-ion (water ligand) or hydroxide ion ligand or hydrogen ion, but contain no other elements. Examples of these compounds are $PtCl_2$, $PtCl_4$, $PtCl_4.2H_2O$, $H_2[Pt(OH)_2Cl_4].nH_2O$ and $H_2[PtCl_6].nH_2O$, Similarly, the platinum bromide compounds include platinum bromides such as $PtBr_2$ and $PtBr_4$, the platinum iodide compounds include platinum iodides such as $PtI_2$ and $PtI_4$, and the platinum fluoride compounds include platinum fluorides such as $PtF_4$.

Among the halogenated platinum compounds, platinum chloride compounds which are compounds of chlorine element and platinum are high in effect and preferred, and platinum chlorides are particularly preferred. Furthermore, platinum chlorides having one chlorine atom or a plurality of chlorine atoms and a plurality of aquo-ions (water ligands) or hydroxide ion ligands are preferred, and platinum chlorides in which one chlorine atom is bonded to platinum metal are more preferred.

The manner of supporting of the halogenated platinum compound is not limited, and it may be in the state of being adsorbed to the surface of titanium oxide particles or in the state of being strongly bonded upon reacting with surface of the particles, for example, in the state of forming a halogenated platinum complex represented by $Ti[PtX_n]$ (X: halogen, and n=4 or 6). Alternatively, it may be partially adsorbed or partially bonded.

The amount of halogenated platinum compound supported is preferably 0.01-5% by weight in terms of Pt based on titanium oxide particles because within this range, excellent photocatalytic activity under irradiation with visible light can be readily obtained, more preferably 0.01-1% by weight, further preferably 0.01-0.7% by weight. When the halogenated platinum compound is supported in a slight amount as above, it is difficult to specify the composition, but if halogen element and platinum are detected by X-ray fluorescence analysis, it is considered in the present invention that the halogenated platinum compound is supported.

Next, the present invention relates to a method for producing a visible light-responsive photocatalyst which comprises contacting titanium oxide particles with a halogenated platinum compound in a liquid medium to support the halogenated platinum compound on the surface of the titanium oxide particles, and then adjusting the pH of the liquid medium to 5 or less. Coloration to light yellow of the halogenated platinum compound is inhibited by adjusting the pH of the liquid medium to strong acidic area after supporting the halogenated platinum compound, and thus a visible light-responsive photocatalyst having white hue less in yellowness of powder color can be obtained. Particularly, when titanium oxide particles having a specific surface area of 10-100 m$^2$/g according to the BET method are used, a visible light-responsive photocatalyst is obtained which is high in photocatalytic activity under irradiation with visible light, hardly decreases in photocatalytic activity even when irradiated with light for a long period of time, and thus can be continuously used. The specific surface area of the titanium oxide particles used is preferably 30-80 m$^2$/g.

As the titanium oxide particles in the present invention, there may be used those which are produced by known processes, which include, for example, (1) a process of hydrolyzing with heating titanium sulfate, titanyl sulfate, titanium chloride, and the like, (2) a process of neutralizing titanium sulfate, titanyl sulfate, titanium chloride, and the like, and (3) a process of firing or hydrothermal treating the product obtained by the above process (1) or (2). Furthermore, titanium oxide particles having anisotropic shapes can also be produced by known processes, and, for example, there may be employed a process of treating hydrous titanium oxide with a basic sodium compound such as sodium hydroxide, sodium carbonate or sodium oxalate, followed by treating with hydrochloric acid. The titanium oxide particles obtained by these processes are fine particles and have so-called spindle shape, and hence they are preferably used. The resulting titanium oxide particles may be optionally subjected to common operations such as filtering off, washing and drying.

Moreover, when titanium oxide particles which are previously fired or obtained by firing titanium oxide precursors are used in the present invention, crystallinity of titanium oxide particles after fired or titanium oxide particles obtained by firing can be improved or hydroxyl group contained or water content can be properly reduced, and photocatalytic activity under irradiation with visible light is further improved, which is preferred. The titanium oxide precursors are compounds which are converted to titanium oxide particles by firing, and examples of them are titanium sulfate, titanyl sulfate, titanium chloride, titanium alkoxides, etc. When hydrous titanium oxide or titanium hydroxide is fired to obtain titanium oxide particles, the hydrous titanium oxide and titanium hydroxide belong to the titanium oxide precursors. The firing temperature is preferably 200-700° C., and if the firing temperature is lower than this range, the effect to improve photocatalytic activity under irradiation with visible light can hardly be obtained, and if it is higher than this range, not only further improving effect can hardly be obtained, but also sintering of the produced or grown photocatalyst particles is apt to occur, which is not preferred. The firing temperature is more preferably 200-600° C., further preferably 300-600° C. The conditions such as firing time and firing atmosphere can be optionally set, and the firing time is suitably, for example, about 1-10 hours, and the firing atmosphere is suitably an atmosphere of air or oxygen-containing gas, or inert gas atmosphere such as nitrogen or argon.

Titanium oxide particles and halogenated platinum compound are contacted in a liquid medium to support the halogenated platinum compound on the surface of the titanium oxide particles by a method of dispersing titanium oxide particles in a liquid medium and adding the halogenated platinum compound to the dispersion, a method of adding titanium oxide particles to a solution of the halogenated platinum compound, or the like. The halogenated platinum compound used is preferably the above-mentioned inorganic halogenated platinum compound, more preferably a platinum chloride compound, especially preferably platinum chloride compound. As the liquid medium, there may be used inorganic or organic liquid such as water, alcohol or toluene, and, industrially, water is easy in handling and is preferred. Patent Documents 2-3 disclose a method of using a supporting accelerator such as hypophosphorous acid in supporting the halogenated platinum compound, but when the supporting accelerator is used, the effect to improve powder color can hardly be obtained, and hence in the present invention, it is not preferred to use the supporting accelerator. After supporting the halogenated platinum compound, pH of the liquid medium is adjusted to 5 or less, preferably 4 or less using an acidic compound such as hydrochloric acid, sulfuric acid, nitric acid or hydrofluoric acid to obtain the visible light-responsive photocatalyst.

It is preferred to contact the titanium oxide particles and the halogenated platinum compound with heating because yield of the halogenated platinum compound increases. The heating temperature is preferably 50-250° C., and at a temperature of 100° C. or higher, the present invention can be carried out using a high-temperature and high-pressure device such as autoclave. The heating temperature is more preferably 50-100° C., most preferably 70-100° C.

Even when pH of the liquid medium is adjusted to 5 or less and, thereafter, neutralization is carried out with heating, yield of the halogenated platinum compound is improved, which is preferred. After titanium oxide particles are contacted with halogenated platinum compound at room temperature, the heating may be carried out at the time of neutralization, but when they are contacted with heating, and, successively, neutralization is carried out with maintaining the contacting temperature, the yield of the halogenated platinum compound is further improved, and thus this is the most preferred embodiment. The heating time is preferably 10 minutes-10 hours, and the heating temperature is preferably 50-250° C. The neutralization may be carried out at a temperature of 100° C. or higher using a high-temperature and high-pressure device such as autoclave, and the heating temperature is more preferably 50-100° C., most preferably 70-100° C. The neutralization is preferably carried out at a pH of 6-8, and known alkaline compounds such as ammonia, amines, hydroxides or carbonates of alkali metals or alkaline earth metals can be used as neutralizing agents.

In the case of obtaining the photocatalyst in the form of powder, it may be subjected to filtration and drying after washing by known method, and, if necessary, grinding may be conducted.

As another method, in contacting the titanium oxide particles with the halogenated platinum compound in the liquid medium, if the halogenated platinum compound in the liquid medium is irradiated with light by fluorescent lamp, high pressure mercury lamp, or the like, or titanium trichloride is added to the liquid medium, the halogenated platinum compound in the state of containing less halogen atoms is supported on the surface of the titanium oxide particles, and thus the photocatalyst obtained is less in yellowness, namely, having a b* value of the powder color of not more than 6. The intensity of irradiation and the amount of titanium trichloride are not particularly limited, and can be optionally set depending on the amount of halogenated platinum compound and the contacting time. When the halogenated platinum compound is reduced to metallic platinum of 0 in valence by carrying out the irradiation with light or the addition of titanium trichloride, the L* value of powder color decreases due to production of the metallic platinum and further the visible light responsiveness decreases, which is not preferred, and conditions under which metallic platinum is not produced must be selected. Therefore, it is not preferred to add an alcohol in irradiation with light or to use sodium borohydride having higher reducing power than titanium trichloride. Production of metallic platinum can be visually observed by the change in color (changing to black), and can be confirmed by reduction in visible light responsiveness.

When the visible light-responsive photocatalyst of the present invention is actually used for photocatalytic reaction, it is convenient to fix the photocatalyst to a base or use as a molded product by molding and granulating the photocatalyst as required. The base may be one which is formed of various materials such as metals, tiles, enamels, cements, concretes, glasses, plastics, fibers, woods and papers, and the base may have various shapes such as plate, corrugated plate, honeycomb, sphere and curved surface.

For fixing the photocatalyst on a base, there may be employed a method of coating or spraying the visible light-responsive photocatalyst on the surface of the base by preparing a photocatalyst coating agent and then drying or firing the coat. The photocatalyst coating agent contains at least a binder, and an inorganic resin or organic resin can be used as the binder. The binder is preferably one which can hardly be decomposed by the photocatalytic reaction, such as, for example, polymerizable silicon compound, cement, concrete, gypsum, silicone resin and fluoro resin, and among them the polymerizable silicon compound is preferred because it is high in endurance, relatively easy in handling, and high in general-purpose properties. As the polymerizable silicon compound, mention may be made of, for example, hydrolysable silanes or hydrolyzates thereof or partial condensates thereof, water glasses, colloidal silica, and organopolysiloxanes, and these may be used each alone or in admixture of two or more. The hydrolysable silanes are those which contain at least one hydrolysable group such as alkoxy group and halogen group, and among them, alkoxysilanes are preferred from the point of stability and economical point, and particularly tetraalkoxysilanes such as tetramethoxysilane and tetraethoxysilane are high in reactivity and are preferred. Water glasses include sodium-silicic acid type, potassium-silicic acid type, lithium-silicic acid type, etc., among which sodium-silicic acid type is preferred because it is high in stability. Water glasses of sodium-silicic acid type having a molar ratio of $Na_2O$ and $SiO_2$ in the range of 2-4 are high in hardenability, and No. 3 water glass having the molar ratio of 3 is particularly preferred from the point of balancing between stability and hardenability. As the colloidal silicas and organopolysiloxanes, there may be used those which have silanol group. The coating agent may further contain water or non-aqueous solvents such as alcohols, hydrocarbons, ethers, ether alcohols, esters, ether esters and ketones as dispersing media, and one of them or a mixed solvent containing two or more of them is optionally selected depending on the compatibility with the binder. The solid concentration of the coating agent is preferably 1-50% by weight, more preferably 10-40% by weight. The photocatalyst is contained in an amount of preferably 50-95% by weight, more preferably 70-95% by weight in solid matter.

The coating agent may contain various additives such as pH adjustor, dispersant, anti-foaming agent, emulsifier, colorant, extender, antifungal agent, hardening assistant and thickening agent, fillers, etc. in addition to the photocatalyst, binder and dispersing medium, so long as the effect of the present invention is not damaged. In the case of these additives and fillers being non-volatile, it is preferred to select inorganic materials which are hardly decomposed by photocatalytic action.

The visible light-responsive photocatalyst of the present invention may be in the form of a dispersion prepared by previously dispersing it in a dispersing medium. When the photocatalyst coating agent is prepared using the dispersion, a high dispersibility can be readily obtained, which is preferred. Alternatively, without using binder, the dispersion can be diluted to a proper concentration and coated or sprayed onto the surface of base, and then dried and fired to fix the photocatalyst on the base. As the dispersing medium of the dispersion, a dispersing medium which is the same as the one contained in the coating agent or which is high in compatibility is selected. Furthermore, a dispersant may be added to the dispersion, and the kind of the dispersant is selected depending on the dispersing medium. As the dispersant, mention may be made of, for example, (1) surface active agents ((a) anionic type (carboxylic acid salts, sulfuric acid esters, sulfonic acid salts, phosphoric acid ester salts, etc.), (b) cationic type (alkylamine salts, quaternary ammonium salts of alkylamines, aromatic quaternary ammonium salts, heterocyclic quaternary ammonium salts, etc.), (c) amphoteric type (betaine type, amino acid type, alkylamine oxides, nitrogen-containing heterocyclic type, etc.), (d) nonionic type (ether type, ether ester type, ester type, nitrogen-containing type, etc., and the like, (2) silicone type dispersants (alkyl-modified polysiloxanes, polyoxyalkylene-modified polysiloxanes, etc.), (3) phosphate type dispersants (sodium phosphate, sodium pyrophosphate, sodium orthophosphate, sodium metaphosphate, sodium tripolyphosphate, etc.), (4) alkanolamines (aminomethylpropanol, aminomethylpropanediol, etc.), and the like. Among them, carboxylic acid salt type surface active agents, particularly, those of high molecular type, are preferred because they can highly disperse titanium oxide. Specific examples thereof are polyacrylic acid salts ($[CH_2CH(COOM)]_n$: M in this chemical formula and the following chemical formulas denotes alkali metal, alkaline earth metal, ammonium, or the like), acrylic acid salt-acrylamide copolymers ($[CH_2CH(COOM)]_n$—$[CH_2CH(CONH_2)]_m$), acrylic acid-maleic acid salt copolymers ($[CH_2CH(COOH)]_n$—$[CH_2CH(COOM)CH(COOM)]_m$), ethylene-maleic acid salt copolymers ($[CH_2CH_2]_n$—$[CH(COOM)CH(COOM)]_m$), olefin-maleic acid salt copolymers ($[CH_2CH(R)]_n$—$[CH(COOM)CH(COOM)]_m$), styrene-maleic acid salt copolymers ($[CH_2CH(C_6H_5)]_n$—$[CH(COOM)CH(COOM)]_m$), and the like. The amount of the photocatalyst in the dispersion is preferably 5-90% by weight, more preferably 10-80% by weight. The amount of the dispersant is preferably 0.01-20% by weight, more preferably 0.01-10% by weight based on the photocatalyst.

When the photocatalyst is molded and used, if necessary, it can be molded into optional shapes after mixing with a binder such as clay, diatomaceous earth, organic resin, inorganic resin, or the like.

EXAMPLES

The present invention will be further explained by the following examples, which should not be construed as limiting the invention.

Example 1

Spindle-shaped titanium dioxide particles having an average major-axis length of 64 nm and an average minor-axis length of 13 nm (aspect ratio: 4.9), and a specific surface area of 160 $m^2/g$ were used as unfired photocatalyst particles, and the unfired spindle-shaped titanium dioxide particles were fired at 350° C. for 5 hours. The resulting fired spindle-shaped titanium dioxide particles had a specific surface area of 63 $m^2/g$, and an average major-axis length of 38 nm and an average minor-axis length of 19 nm (aspect ratio: 2.0).

Then, 50 g of the fired spindle-shaped titanium dioxide particles were added to 0.5 liter of pure water, followed by stirring to obtain a dispersion. To the dispersion was added 0.675 g of hexachloroplatinic acid hexahydrate (corresponding to 0.5% by weight as Pt based on $TiO_2$), followed by mixing and heat treating the mixture at 90° C. for 1 hour. After the heat treatment, pH was adjusted to 3 with sulfuric acid, and then keeping the temperature at 90° C., the mixture was neutralized with sodium hydroxide to give a pH of about 7, then filtered, washed, dried at 110° C. for 24 hours, and thereafter ground by a mortar to obtain the visible light-responsive photocatalyst of the present invention (Sample A).

Comparative Example 1

0.675 g of hexachloroplatinic acid hexahydrate (corresponding to 0.5% by weight as Pt based on $TiO_2$) was added to 0.5 liter of pure water, followed by stirring to obtain a solution. Then, 50 g of the fired spindle-shaped titanium dioxide particles used in Example 1 were mixed with the resulting solution. Thereafter, 1.44 milliliter of an aqueous hypophosphorous acid solution (50% aqueous solution) was added to the mixture, followed by heat treatment at 90° C. for 1 hour. After the heat treatment, the mixture was cooled, and then filtered, washed and dried at 110° C. for 24 hours, and thereafter ground by a mortar to obtain a visible light-responsive photocatalyst (Sample B).

Comparative Example 2

A visible light-responsive photocatalyst (Sample C) was obtained in the same manner as in Comparative Example 1, except that the chloroplatinic acid was supported on unfired spindle-shaped titanium dioxide particles in place of the fired spindle-shaped titanium dioxide particles.

Comparative Example 3

A visible light-responsive photocatalyst (Sample D) was obtained in the same manner as in Comparative Example 1, except that the chloroplatinic acid was supported on unfired spherical titanium oxide particles (ST-01 having an average particle diameter of 4.5 nm and a specific surface area of 320 $m^2/g$ and manufactured by Ishihara Sangyo Kaisha, Ltd.) in place of the fired spindle-shaped titanium dioxide particles.

Comparative Example 4

60 g of titanyl sulfate obtained at production of sulfate process titanium oxide was dissolved in 40 liters of water, and the resulting aqueous solution was concentrated at a temperature of 70° C. using a rotary evaporator to remove water and finally evaporated to dryness. The resulting concentrated product was added to 275 g of ammonia water of 25% in concentration over a period of 93 minutes with stirring while cooling with a refrigerant of −30° C., followed by aging for 4 hours to obtain a reaction product. The resulting reaction product was filtered, washed, dried, and then fired at a temperature of 400° C. for 1 hour in the air to obtain a visible light-responsive photocatalyst (Sample E).

Evaluation 1: Powder Characteristics

The b* value and L* value of the powder color of Samples A-E obtained in Example 1 and Comparative Examples 1-4 were measured by the method mentioned in the above paragraph [0009]. Further, the specific surface area was measured by the BET method. The results are shown in Table 1. It can be seen that the visible light-responsive photocatalyst of the present invention was small in b* value and had a white hue less in yellowness.

TABLE 1

|  | Sample | b* value | L* value | Specific surface area (m²/g) |
|---|---|---|---|---|
| Example 1 | A | 5.0 | 98.7 | 60 |
| Comparative Example 1 | B | 7.0 | 97.5 | 60 |
| Comparative Example 2 | C | 7.0 | 97.8 | 130 |
| Comparative Example 3 | D | 3.8 | 97.1 | 290 |
| Comparative Example 4 | E | 11.3 | 95.2 | 100 |

Evaluation 2: Acetaldehyde Decomposition Activity 0.1 g of each of Samples A-E obtained in Example 1 and Comparative Examples 1-4 was uniformly spread in a laboratory dish of 6 cmφ. Acetaldehyde and synthetic air were filled in a flexible bag of 2 liters in capacity, and concentration of acetaldehyde was adjusted to 210 ppm. The laboratory dish was placed in a separable flask of 500 milliliters, and then connected with the flexible bag, followed by circulating the gas in the system at a rate of 3 liters/min by a pump to carry out the reaction. After reaching adsorption equilibrium under dark condition (for about 30 minutes), the reaction product was irradiated with a light by a white fluorescent lamp of 5700 lx for 500 hours. The gas in the system was collected by a syringe from a sampling port, and concentration of acetaldehyde was measured by a gas chromatograph. A reduction rate constant ($k_1$) of the acetaldehyde concentration was calculated by the following formula 1, and photocatalytic activity was evaluated. Successively, irradiation with light was carried out for further 500 hours, and then a reduction rate constant ($k_2$) of the acetaldehyde concentration was calculated in the same manner. The greater the reaction rate constant, the higher the photocatalytic activity. The results are shown in Table 2. It can be seen that the visible light-responsive photocatalyst of the present invention was high in photocatalytic activity under irradiation with visible light having a wavelength of 400-800 nm, and, furthermore, was small in reduction of photocatalytic activity even when irradiation with light was carried out continuously for a long time.

$$\ln(C/C_o) = -k_n t \quad \text{Formula 1}$$

$k_n$: Reaction rate constant (1/h)
t: Reaction time (h)
C: Acetaldehyde concentration after irradiation with light (ppm)
$C_o$: Acetaldehyde concentration at the starting of irradiation with light (ppm)

TABLE 2

| Sample | | Reaction rate constant ($k_1$) (1/h) | Reaction rate constant ($k_2$) (1/h) | Activity retention rate [($k_2/k_1$) × 100] |
|---|---|---|---|---|
| Example 1 | A | 4.8 | 4.0 | 83.3 |
| Comparative Example 1 | B | 4.8 | 1.5 | 31.2 |
| Comparative Example 2 | C | 1.2 | 0.8 | 66.6 |
| Comparative Example 3 | D | 0.5 | 0.4 | 80.0 |
| Comparative Example 4 | E | 0.5 | 0.4 | 80.0 |

Example 2

Sample A obtained in Example 1 and 200 g of glass beads were charged in a beads mill of 500 cc in capacity at the formulations shown in Table 3, and were dispersed at 3000 rotations for 10 minutes. Then, the dispersion was diluted with pure water to adjust the solid concentration to 19.1% by weight to obtain a photocatalyst dispersion of the present invention (Sample F). Sample F had a pH of 8.5 and a viscosity of 5.5 mPa·s.

TABLE 3

| Sample A | 600.0 g |
|---|---|
| Pure water | 400.0 g |
| Dispersant (SHALLOL AH-103P: polyacrylate polymer, manufactured by Dai-ichi Kogyo Seiyaku Co., Ltd.) | 4.5 g |

Example 3

Sample A obtained in Example 1 and 80 g of glass beads were charged in a glass vessel of 225 cc in capacity at the formulation shown in Table 4, and were dispersed for 60 minutes using a paint conditioner (manufactured by Red Devil Co., Ltd.). Then, to 100 parts by weight of the resulting suspension was added 0.1 part by weight of sodium polyacrylate (manufactured by Kishida Chemical Co., Ltd.) as a thickening agent, followed by mixing. Furthermore, the suspension was diluted with pure water to adjust the solid concentration to 19.9% by weight, thereby obtaining a photocatalyst coating agent of the present invention (Sample G). Sample G had a pH of 8.7 and a viscosity of 149 mPa·s.

TABLE 4

| Sample A | 56.0 g |
|---|---|
| Pure water | 224.0 g |
| Colloidal silica (SNOWTEX UP manufactured by Nissan Chemical Industries, Ltd.) | 120.0 g |

Each of Samples F and G obtained in Examples 2 and 3 was dropped in a laboratory dish of 6 cmφ and uniformly spread therein, and then dried at 110° C. for 12 hours to obtain a photocatalyst composite. Thereafter, the same test as of evaluation 2 was conducted to confirm that excellent decomposition activity for acetaldehyde was obtained under irradiation with visible light.

It was confirmed that when Sample A obtained in Example 1 was molded and granulated using clay to prepare a photocatalyst composite, the resulting photocatalyst was high and stable in photocatalytic activity under irradiation with visible light. It was further confirmed that the photocatalyst was also high in the photocatalytic activity under irradiation with ultraviolet rays, could effectively use the irradiation light, and had excellent photocatalytic activity.

Example 4

A dispersion was prepared by adding 50 g of the fired spindle-shaped titanium dioxide particles used in Example 1 to 0.5 liter of pure water, followed by stirring. To the dispersion was added 0.675 g of hexachloroplatinic acid hexahydrate (corresponding to 0.5% by weight as Pt based on $TiO_2$), and they were mixed. Then, pH of the mixture was adjusted to 3 with sulfuric acid, and 120 g of a 1% by weight aqueous titanium trichloride solution was added thereto, followed by heat treating the mixture at 90° C. for 1 hour. After the heat treatment, pH was adjusted to 1.5 with nitric acid, and then, keeping the temperature at 90° C., the mixture was neutralized with sodium hydroxide so as to give a pH of about 7, then filtered, washed, dried at 110° C. for 24 hours, and thereafter ground by a mortar to obtain the visible light-responsive photocatalyst of the present invention (Sample H).

The Sample H had a b* value of powder color of 0.3, and although it supported platinum chloride compound, metallic platinum was not produced. Furthermore, it had a specific surface area of 60 $m^2/g$, a reaction rate constant $k_1$ of 4.8 (1/h) measured by the method of the evaluation 2, and had visible light responsiveness.

Example 5

A dispersion was prepared by adding 50 g of the fired spindle-shaped titanium dioxide particles used in Example 1 to 0.5 liter of pure water, followed by stirring. To the dispersion was added 0.675 g of hexachloroplatinic acid hexahydrate (corresponding to 0.5% by weight as Pt based on $TiO_2$), and they were mixed. Then, the mixture was heat treated at 90° C. for 3 hours while irradiating it with a fluorescent lamp so that the illuminance at the liquid surface reached 600 lx. After the heat treatment, pH of the mixture was adjusted to 3 with sulfuric acid, and then, keeping the temperature at 90° C., the mixture was neutralized with sodium hydroxide so as to give a pH of about 7, then filtered, washed, dried at 110° C. for 24 hours, and thereafter ground by a mortar to obtain the visible light-responsive photocatalyst of the present invention (Sample I).

The Sample I supported platinum chloride compound, but metallic platinum was not produced, and it had a b* value of powder color of 6 or less, and a specific surface area of 60 $m^2/g$, and had visible light responsiveness.

Comparative Example 5

In the above Example 5, to the dispersion of the fired spindle-shaped titanium dioxide particles was added hexachloroplatinic acid hexahydrate, followed by mixing, and then 5 milliliters of ethanol was added to the mixture. Then, the mixture was heat treated at 90° C. for 3 hours while irradiating it with a fluorescent lamp so that the illuminance at the liquid surface reached 600 lx. The ethanol was additionally added in an amount of 5 milliliters every 1 hour taking into consideration the evaporation loss. After the heat treatment, pH was adjusted to 3 with sulfuric acid, and then keeping the temperature at 90° C., the mixture was neutralized with sodium hydroxide so as to give a pH of about 7, then filtered, washed, dried at 110° C. for 24 hours, and thereafter ground by a mortar to obtain a photocatalyst (Sample J).

The Sample J supported metallic platinum, and the visible right responsiveness was hardly measured by the method of the evaluation 2.

INDUSTRIAL APPLICABILITY

The photocatalyst of the present invention has excellent visible light responsiveness and white hue less in yellowness, and can be easily made into coating agent and dispersion. Thus, it can be utilized for a wide variety of uses such as purifying agents, deodorizing agents, anti-pollution agents, sterilizing agents, and anti-fogging agents in environments under irradiation with visible light.

The invention claimed is:

1. A method for producing a visible light-responsive photocatalyst which comprises contacting a titanium oxide particle and a halogenated platinum compound in a liquid medium to support the halogenated platinum compound on the surface of the titanium oxide particle in the absence of a supporting accelerator, and then adjusting pH of the liquid medium to 5 or less, and carrying out neutralization with heating, after adjusting the pH.

2. A method for producing a visible light-responsive photocatalyst according to claim 1, wherein the titanium oxide particle has a specific surface area of 10-100 $m^2/g$ according to the BET method.

3. A method for producing a visible light-responsive photocatalyst according to claim 1, which uses a fired titanium oxide particle.

4. A method for producing a visible light-responsive photocatalyst according to claim 1, which uses a titanium oxide particle obtained by firing a titanium oxide precursor.

5. A method for producing a visible light-responsive photocatalyst according to claim 3, wherein a firing temperature is 200-700° C.

6. A method for producing a visible light-responsive photocatalyst according to claim 1, wherein the titanium oxide particle and the halogenated platinum compound are contacted with heating.

7. A method for producing a photocatalyst coating agent which comprises contacting a titanium oxide particle and a halogenated platinum compound in a liquid medium to support the halogenated platinum compound on the surface of the titanium oxide particle in the absence of a supporting accelerator, and then adjusting pH of the liquid medium to 5 or less, and carrying out neutralization with heating, after adjusting the pH, and adding a binder.

8. A method for producing a photocatalyst dispersion which comprises contacting a titanium oxide particle and a halogenated platinum compound in a liquid medium to support the halogenated platinum compound on the surface of the titanium oxide particle in the absence of a supporting accelerator, and then adjusting pH of the liquid medium to 5 or less, and carrying out neutralization with heating, after adjusting the pH, and adding a dispersion medium.

* * * * *

UNITED STATES PATENT AND TRADEMARK OFFICE
CERTIFICATE OF CORRECTION

PATENT NO.        : 7,820,584 B2
APPLICATION NO.   : 12/225011
DATED             : October 26, 2010
INVENTOR(S)       : Youichi Ishibai et al.

Page 1 of 1

It is certified that error appears in the above-identified patent and that said Letters Patent is hereby corrected as shown below:

Title Page
    (73) Assignee: delete "Nihon Nohyaku Co., Ltd., Tokyo (JP)" and insert
-- Ishihara Sangyo Kaisha, Ltd., Osaka (JP) --

Signed and Sealed this
First Day of May, 2012

David J. Kappos
*Director of the United States Patent and Trademark Office*